Oct. 1, 1940. H. A. ERIKSON 2,216,566
ROLLBACK CHECK
Filed Sept. 23, 1939 2 Sheets-Sheet 2
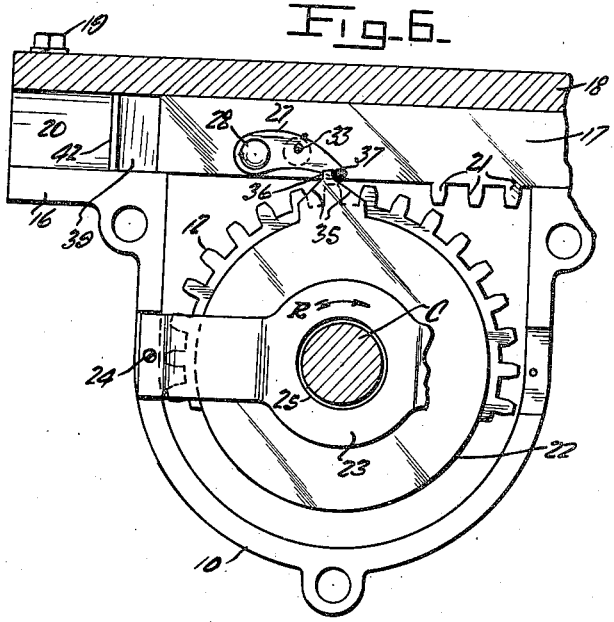
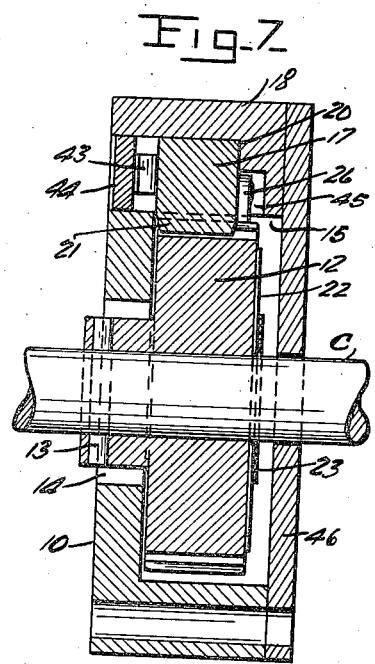
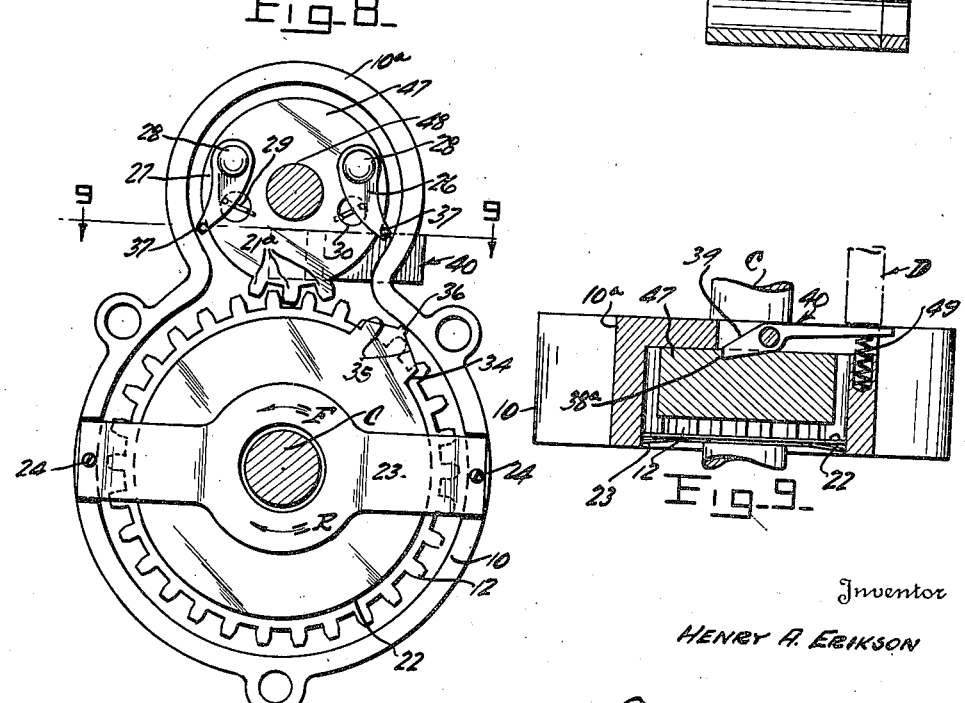
Inventor
HENRY A. ERIKSON
By Carlsen + Hoyle
Attorneys Patented Oct. 1, 1940

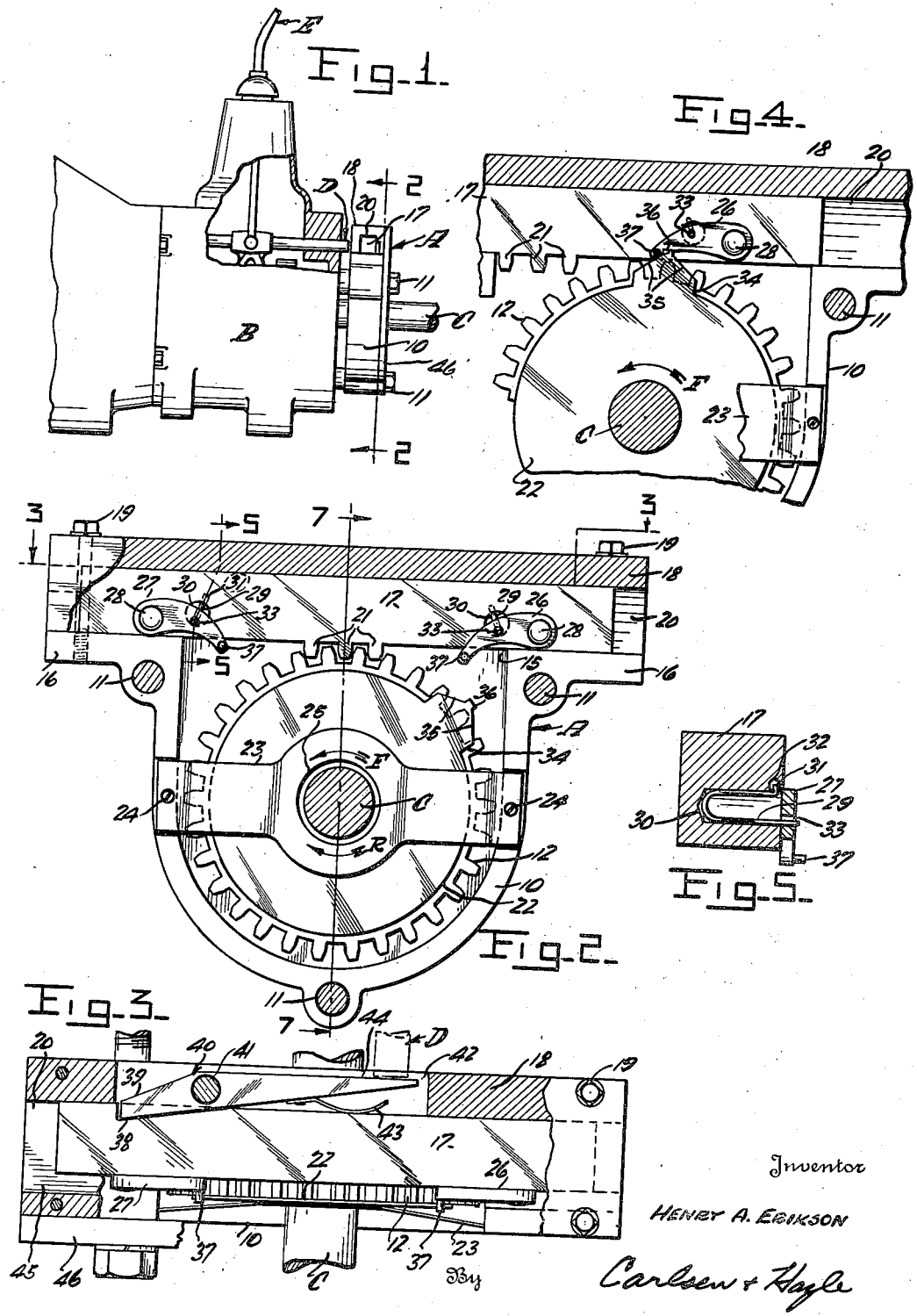

2,216,566

UNITED STATES PATENT OFFICE 2,216,566

ROLLBACK CHECK

Henry A. Erikson, Minneapolis, Minn.

Application September 23, 1939, Serial No. 296,270

15 Claims. (Cl. 192—4)

This invention relates to devices for use in checking or restraining a motor vehicle against retrograde movement at all times except when power driven rearward movement is desired.

There are numerous circumstances in which retrograde or rearward movement of a motor vehicle is not wanted and in which such movement is actually a hazard. For example when a vehicle stalls on an incline the tendency is for it to roll backward requiring that the driver not only apply his brakes, but also sometimes to restart and accelerate the engine and actuate the clutch while shifting to a lower speed gear. Other times the engine is disengaged from the drive or propeller shaft such as when gears are being shifted or the clutch is disengaged and an undesired rearward movement occurs.

Having in mind these facts, it is the primary object of my invention to provide a device by means of which the propeller or drive shaft of a vehicle may be positively locked or checked against movement such as necessary in the rearward travel of the vehicle, but in such manner that the normal action of shifting the gear shift lever to the reverse position will automatically release the check and enable the vehicle to be backed without interference.

Another object is to provide a device of this kind which may be readily attached to a motor vehicle as at present constructed and which will not in any way interfere with the normal operation thereof.

These and other more detailed and specific objects will be disclosed in the course of the following specification, reference being had to the accompanying drawings, in which—

Fig. 1 is a fragmentary side elevation of the transmission and drive shaft elements of a motor vehicle showing my invention applied thereto.

Fig. 2 is an enlarged cross sectional view along the line 2—2 in Fig. 1.

Fig. 3 is a horizontal sectional view along the line 3—3 in Fig. 2.

Fig. 4 is a fragmentary view similar to Fig. 2, but showing the positions the parts assume when the vehicle is traveling forwardly.

Fig. 5 is an enlarged cross section along the line 5—5 in Fig. 2.

Fig. 6 is a view similar to Fig. 4, but showing the position assumed by the parts when the check is released, and the vehicle is moving rearwardly.

Fig. 7 is a vertical section along the line 7—7 in Fig. 2.

Fig. 8 is a view similar to Fig. 2, but showing a modified form of checking device.

Fig. 9 is a horizontal section along the line 9—9 in Fig. 8.

Referring now with more particularity to the drawings, the reference character A designates generally by check or lock device and the same comprises a housing 10 which is secured, as by means of bolts 11, to the rear of the usual change speed transmission housing B of the vehicle so that the drive or propeller shaft C, leading to the differential and wheels, extends through the housing. The housing 10 is mounted rigidly so that it cannot rotate with the shaft C, but of course the manner in which the housing is supported may be varied from that shown, as may be found best.

Mounted within the rounded or cylindrical lower portion of the housing 10 is a toothed operating member or gear 12 which turns freely within the housing and is secured rigidly at 13 to the shaft C to turn therewith as the engine drives the vehicle. An opening 14 in the forward wall of the housing 10 clears the gear hub and shaft as shown. The housing opens upwardly as at 15 and has outwardly turned ears 16 at each side faced off to support thereon a rack bar 17 which constitutes functionally a locking member for the gear 12. Said rack bar is slidably retained in place for movement transversely of the axis of the shaft C by a cap or cover member 18 secured at 19 atop the housing 10 and grooved on its lower side at 20 to embrace the bar. The rack bar 17 has three, more or less, gear teeth 21 on its lower side for meshing engagement with the gear 12.

A release member or disk 22 is mounted freely on the shaft C against the rear face of the gear 12 and is pressed yieldably thereagainst by a spring 23 which is secured at the ends at 24 to the rear lateral edges of the housing 10 and extends diametrically across the disk. This spring has a central aperture 25 which substantially clears the shaft C and is tensioned or sprung forwardly against the disk 22 to urge the same into frictional engagement with the gear 12, the result of which is, of course, to cause the disk to rotate with the gear until brought up by means which will be set forth. Experience has proven that a very light spring pressure is required for this purpose, and wear is thus not a material factor.

The rack bar or locking member 17 carries spaced (transversely) dogs or pawls 26 and 27 which are pivoted at 28 to the rear vertical face of the bar and normally depend inwardly and downwardly at their free ends into the housing 10 in position, when the bar is shifted endwise, for engaging the gear 12 which, as seen in Figs. 3 and 7, is of such thickness that it extends substantially rearwardly of the bar for this purpose. These pawls 26 and 27 are urged downwardly at their free ends by U-shaped wire springs 29 which are inserted, bight end first, into holes 30 bored in the rear faces of the bar 17 in position to be traversed at their open ends by the pawls as they swing in their vertical plane of movement. One end of each spring 29 is hooked at 31 to enter a small socket 32 in the upper wall of the hole 30 while the other projects through an opening 33 in the respective pawl. The springs are tensional so that their legs normally spring apart, and as a result they not only will retain themselves in place in the bar, but will yieldably resist upward movement of the pawls at the same time limiting the downward movement thereof.

The disk 22 has a radial projection 34 which terminates in angular cam faces or shoulders 35 and an intermediate stop lug 36, and this projection is extended in position to engage pick-up fingers 37 on the pawls 26 and 27 when the same are in gear engaging position, as will hereinafter appear. Obviously the fingers 37 might be placed on the lug 36 to engage the pawls instead of the opposite relationship of the parts as herein shown, if so desired.

On its forward vertical face, toward the transmission B, the bar 17 is notched at 38 for engagement with the end 39 of a latch 40 which is fulcrumed at 41 on an upright axis and is arranged in a slot 42 in the cap member 18. A leaf spring 43 carried by the operating or lower end 44 of the latch engages the bar 17 to normally urge the latch into locking engagement with the bar, and in this position the bar is locked in a centrally adjusted position (the teeth 21 in mesh with the gear 12) against movement toward the right as viewed in the drawings. The lever end 44 of the latch, however, is disposed immediately to the rear of the usual shifting bar or rod D of the transmission B which in normal operation moves rearwardly as the gear shift lever E is manipulated to shift the transmission to reverse, and the rod thus engages and swings the latch 40 clear of the notch 38.

The cap member 18 is further grooved as shown at 45 to clear the pawls 26 and 27, and a rear cover plate 46 is provided over the housing 10 as shown.

In now describing the operation of the device it is assumed that the shaft C turns in the direction of the arrow F in Figs. 2 and 4 for forward travel of the vehicle, and in the direction of the arrow R in Figs. 2 and 6 for reverse travel, although as a matter of course the device may be made operative on other vehicles, wherein the respective directions of drive shaft rotation are opposite, simply by reversing the locking engagement and direction of the latch 40. In Fig. 2 the device is shown in the position in which reverse movement (arrow R) of the shaft C is positively checked and prevented, such movement being opposed by the meshing of the gear 12 with the teeth 21, and the movement of the bar 17 towards the right as would be required for reverse travel being stopped by the latch 40, as will be apparent.

As the vehicle is now caused to travel forwardly the movement of the gear 12 in direction of the arrow F moves the bar 17 to the left and the latch 40 easily disengages the bar to permit such movement. The teeth 21 are of course carried clear of the gear 12 in this operation (see Fig. 4) and the pawl 26 is brought over into engaging relation with the gear. However, at the same time the frictional clutching action of the spring 23 on the disk 22 will cause the same to turn with the gear until finally the leading angular face 35 of the disk projection engages the finger 37 and lifts the pawl 26 from engagement with the gear, the further travel of the disk being halted by the engagement of the stop lug 36 with said finger. In this condition of the parts the vehicle may travel forwardly or stop in usual manner and without any interference whatever.

Should, however, the vehicle start to roll rearwardly for any cause, the gear 12 is turned in the opposite direction and here the checking device comes into play. The reversal of the movement of the gear carries the disk 22 around until the shoulder 35 clears the finger 37, whereupon the pawl 26 drops into engagement with the teeth of the gear projecting the bar 17 endwise to the right until the teeth 21 are again meshed with the gear. At this time the notch 38 in the bar 17 receives the latch 40, the bar is locked against further movement, and as a matter of course the further reverse movement of the vehicle is positively halted.

When it is desired to back the vehicle, the gear shift lever E is moved to proper position and the resulting endwise rearward shifting of the rod D causes same to engage the latch 40 and release the same from the notch 38. The gear 12 may now turn in the direction R moving the bar 17 endwise until the teeth 21 are out of mesh and at the same time carrying around the disk 22 until the leading cam edge 35 now engages the finger of the pawl 27 and lifts the same clear of the gear, as shown in Fig. 6. The reverse movement may now continue freely as long as desired. When the vehicle is again moved forwardly the latch 40 is cleared by the rod D (as the gears are shifted) and the gear 12 turning in forward direction F returns the bar 17 to reverse locking position and traverses this position to the condition for forward travel shown in Fig. 4.

In Figs. 8 and 9 I illustrate a modified form of my invention wherein, in lieu of the rock bar 17 aforesaid, I employ as the locking member a rotary member 47 journaled upon a shaft 48 in an upward extension 10a of the housing 10. This member 47 carries teeth (three more or less) 4a which engage the gear 12 and also carries the pawls 26 and 27 constructed and mounted as previously described. The latch 40 here engages by its end 39 a notch 38a in the forward face of the member 47 to lock the same against such movement as would be requisite to the reverse travel of the vehicle, being urged to such position by the spring 43. The latch, however, may be released when desired by engagement therewith of the shifting rod D. In all essentials the operation of this form of my invention is the same as that hereinbefore described, with the exception that a rotary, oscillatory motion is imparted to the release member 47 instead of a reciprocating motion, as will be evident. Corresponding reference numerals are accordingly used to designate parts in common.

It will be evident from the foregoing that I have provided a device which will automatically and positively restrain an equipped vehicle against retrograde movement, but which will nevertheless allow the power backing of the vehicle when so desired. It will be further apparent that little wear can occur since the gear 12 runs entirely free when the vehicle is traveling under power either forwardly or rearwardly. Under some circumstances, such as when a heavy truck becomes stalled on a hill, it may be desired to release the device so that the truck may be allowed to coast rearwardly down the hill. This may be accomplished simply by shifting the transmission to reverse until the release is obtained, adequate leverage being provided by the type of latch 40 here shown.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination with the power driven propeller shaft and reverse shift mechanism of a motor vehicle, of a gear secured to said shaft, a housing around said gear and supported rigidly on the vehicle, a locking member supported for movement in two directions and in a plane transversely extended with respect to the shaft and having teeth at a center portion for meshing engagement with the gear, means for locking the locking member against shifting movement in one direction while said teeth are meshed with the gear and thereby limiting the shaft to a unidirectional rotation for forward travel movement of the vehicle, the said locking means being releasable by the reverse shift mechanism, and means responsive to rotation of the gear for shifting the locking member from engagement with said gear when power driven rotation of the shaft occurs in either direction.

2. The combination with a motor vehicle transmission including a shiftable reversing element and a power driven shaft, of a gear fixed on said shaft, a locking member supported for movement in a plane transversely extended with respect to said shaft and having teeth at a medial portion for meshing engagement with said gear, a latch member arranged to lock said locking member against movement in one direction while in meshing engagement with the gear, the said latch member being disposed adjacent the reversing element of the transmission for direct engagement whereby said latch member will release the locking member when the transmission is shifted to reverse and enable the movement of the member clear of the gear, and means for returning the locking member to engagement with the gear when the shaft is power driven in the opposite direction.

3. The combination with the power driven propeller shaft and reverse shift mechanism of a motor vehicle, of a gear secured to the shaft, a housing around the gear and supported rigidly on the vehicle, a locking member movably supported in the housing for movement in two directions in a plane extending transversely with respect to the shaft, the said locking member having teeth for meshing engagement with the gear whereby rotation of the gear will shift the member in either direction out of engagement with the gear except when released by said reverse shift mechanism, means for locking the said member in meshing engagement with the gear and against movement in one direction, pawls carried by the member for engagement with the gear to return the member to meshing engagement, and means normally retaining the pawls out of engagement with the gear as the gear rotates in one direction but to reengage the pawls when the direction of rotation is reversed.

4. The combination with a motor vehicle transmission including a power driven propeller shaft and reverse shift mechanism, of a gear secured to the shaft, a housing around the gear and supported rigidly on the vehicle, a locking member movably supported in the housing for movement in opposite directions transversely with respect to the shaft, the said locking member having teeth for meshing engagement with the gear whereby rotation of the gear will shift the member in either direction out of engagement with the gear, means for locking the said member in meshing engagement with the gear and against movement in one direction, the said locking means being releasable by the reverse shift mechanism, pawls carried by the member for engagement with the gear to return the member to meshing engagement, and means frictionally engaging the gear and normally retaining the pawls out of engagement with the gear as the gear rotates in either direction but to reengage the pawls when the direction of rotation is reversed.

5. The combination with the power driven propeller shaft and reverse shift mechanism of a motor vehicle, of a gear secured to the shaft, a housing around the gear and supported rigidly on the vehicle, a locking member movably supported in the housing for movement in opposite directions transversely with respect to the shaft, the said locking member having teeth for meshing engagement with the gear whereby rotation of the gear will shift the member in either direction out of engagement with the gear, means for locking the said member in meshing engagement with the gear and against movement in one direction, the said locking means being releasable by the reverse shift mechanism, pawls carried by the member for engagement with the gear to return the member to meshing engagement, and a release member frictionally engaging the gear to rotate therewith and operative to normally disengage the pawls from the gear as the locking member is disengaged but operative to release said pawls when the direction of rotation of the gear is reversed.

6. The combination with the propeller shaft of a motor vehicle, of a gear secured to the shaft to rotate therewith, a housing supported on the vehicle, a bar slidably supported in the housing for endwise movement tangentially with respect to the gear, gear teeth on a medial portion of the bar for meshing engagement with the gear whereby rotary movement of the gear will shift the bar endwise until said teeth unmesh from the gear, means for releasably locking the bar against endwise movement in one direction, and means for returning the bar to meshing engagement with the gear when the direction of rotation thereof is reversed.

7. The combination with the propeller shaft and reverse shift mechanism of a motor vehicle, of a gear secured to the shaft to rotate therewith, a housing supported on the vehicle, a bar slidably supported in the housing for endwise opposite movements tangentially with respect to the gear, gear teeth on a medial portion of the bar for meshing engagement with the gear whereby rotary movement of the gear will shift the bar endwise until said teeth unmesh from the gear, means releasable by the reverse shift mechanism for normally locking the bar against endwise movement in one direction, pawls on the bar for selectively engaging the gear when the bar is shifted in either direction and returning the bar to meshing engagement with the gear, and a disk member frictionally engaging the gear to rotate therewith and operatively engage the pawls to control their engagement with the gear.

8. The combination with the transmission apparatus of a motor vehicle including a propeller shaft and reverse shift mechanism, of a gear secured to the shaft to rotate therewith, a housing supported on the vehicle, a bar slidably supported in the housing for endwise movement in opposite directions tangentially with respect to the gear, gear teeth on a medial portion of the bar for meshing engagement with the gear whereby rotary movement of the gear will shift the bar endwise until said teeth unmesh from the gear, means for locking the bar against endwise movement in one direction and for releasing the bar in response to action of the reverse shift mechanism, pawls mounted on the bar in position for selectively engaging the gear when the bar has been moved in either direction out of meshing engagement with the gear, and a disk frictionally engaged with the face of the gear to rotate therewith and having cam faces for engaging the pawls and lifting the same from the gear until the direction of rotation of the gear is reversed.

9. The combination with the propeller shaft and reverse shift mechanism of a motor vehicle, of a gear secured to the shaft to rotate therewith, a housing supported on the vehicle, a member rotatably supported in the housing in edge to edge relationship with the gear, teeth on a part of the rotary member for meshing engagement with the gear whereby rotation of the gear will oscillate the member until the teeth clear, means for locking the member against movement in one direction and thereby limiting the gear and shaft to unidirectional movement, the said locking means being releasable by the reverse shift mechanism, pawls carried by the rotary member for selectively engaging the gear when the member is moved thereby and returning the member to meshing engagement with the gear, and means operable in conjunction with the gear for selectively engaging said pawls with the gear when the direction of rotation of the gear and shaft is reversed.

10. The combination with a motor vehicle propeller shaft, of means for releasably locking said shaft against movement in one direction and including a housing, a gear fixed on the shaft and arranged in the housing, a locking member for engaging and locking said gear, pawls on said locking member for controlling the operation thereof, a disk member carried at one face of the gear and frictionally engaging said face to rotate with said gear and actuate the pawls, and a leaf spring secured at its ends to the housing and extending across the disk member and tensioned to yieldably urge the disk member into frictional contact with the gear.

11. The combination with a motor vehicle propeller shaft, of means for releasably locking said shaft against movement in one direction and including a housing, a gear fixed on the shaft and arranged in the housing, a locking member for engaging and locking said gear, pawls on said locking member for controlling the operation thereof, a disk member carried at one face of the gear and frictionally engaging said face to rotate with said gear and actuate the pawls, and a leaf spring secured at its ends to the housing and extending across the disk member and tensioned to yieldably urge the disk member into frictional contact with the gear, the said spring having an opening at an intermediate portion for clearing the said propeller shaft.

12. The combination with a motor vehicle transmission assembly including a power driven shaft and a reverse shift mechanism, of a locking means for the shaft comprising a toothed member fixed to the shaft to rotate therewith, a locking member supported for movement in two directions and having teeth at an intermediate portion for meshing engagement with said toothed member, means normally locking the said locking member against movement in one direction while in meshing engagement with the toothed member but permitting movement of the locking member in the opposite direction in response to rotation of the shaft and to a position in which the teeth of the locking member clear said toothed member, the said locking means being releasable by the reverse shift mechanism to permit similar movement of the locking member in the opposite direction by reverse rotation of the shaft, and means engageable with the toothed member in response to reversal of the direction of rotation thereof for reengaging the teeth on said locking member with the said toothed member.

13. The combination with a motor vehicle power transmission device including a power rotated shaft and a reverse shift mechanism, of means for locking the shaft against rotation in one direction subject to release by said reverse shift mechanism, comprising a gear secured to the shaft, a locking member having teeth at a central portion for meshing with the gear and movable in either of two directions by rotation of the gear to a distance causing disengagement of the teeth, means for normally locking the locking member against movement in one direction from meshing engagement with the gear but releasable by the said reverse shift mechanism to permit movement in that direction, and means responsive to a reversal in the direction of rotation of the gear to restore the locking member to meshing engagement with the gear.

14. The combination with a motor vehicle power transmission device including a power rotated shaft and a reverse shift mechanism, of means for locking the shaft against rotation in one direction subject to release by said reverse shift mechanism, comprising a gear secured to the shaft, a locking member having teeth at a central portion for meshing with the gear and movable in either of two directions by rotation of the gear to a distance causing disengagement of the teeth, means for normally locking the locking member against movement in one direction from meshing engagement with the gear but releasable by the said reverse shift mechanism to permit movement in that direction, and means carried by the locking member for engaging the gear as the direction of rotation thereof is reversed for restoring the locking member to meshing engagement with the gear.

15. The combination with a motor vehicle power transmission including a power driven shaft and a reverse shift device, of a gear secured to the shaft, a locking member having teeth meshing with the gear, the said locking member being movable in either of two opposite directions in response to rotation of the gear and until the said teeth run out of mesh with the gear, means for locking the said member in meshing engagement with the gear to prevent movement in one direction but releasable by said reverse shift device to permit movement in either direction, and pawl members carried by the locking member for engagement with the gear as the direction of rotation thereof is reversed and after the gear has shifted the locking member in either direction, the said pawl members being operative to return the locking member to a central position and synchronize the meshing of the teeth of the locking member and gear.

HENRY A. ERIKSON.